United States Patent
Sakata

(10) Patent No.: US 8,132,918 B2
(45) Date of Patent: Mar. 13, 2012

(54) ILLUMINATION APPARATUS, PROJECTOR, AND POLARIZATION CONVERSION ELEMENT

(75) Inventor: Hidefumi Sakata, Tatsuno-cho (JP)

(73) Assignee: Seiko Epson Corporation, Tokyo (JP)

( * ) Notice: Subject to any disclaimer, the term of this patent is extended or adjusted under 35 U.S.C. 154(b) by 330 days.

(21) Appl. No.: 12/615,775

(22) Filed: Nov. 10, 2009

(65) Prior Publication Data

US 2010/0157251 A1   Jun. 24, 2010

(30) Foreign Application Priority Data

Dec. 24, 2008   (JP) ................. 2008-326787

(51) Int. Cl.
*G03B 21/14* (2006.01)
*G03B 21/26* (2006.01)

(52) U.S. Cl. .......................................... 353/20; 353/30

(58) Field of Classification Search ............ 353/20, 353/38, 30, 31, 81; 359/237, 246, 443, 483.01, 359/485.01, 485.03, 485.07, 489.07, 583, 359/437, 629, 490.01, 639

See application file for complete search history.

(56) References Cited

U.S. PATENT DOCUMENTS

2007/0019163 A1* 1/2007 Ikeda et al. .................... 353/20
2007/0165189 A1   7/2007 Kawase et al.

FOREIGN PATENT DOCUMENTS

| JP | A-2003-16802 | 1/2003 |
| JP | A-2005-37745 | 2/2005 |
| JP | A-2007-193148 | 8/2007 |

* cited by examiner

*Primary Examiner* — Que T Le
*Assistant Examiner* — Pascal M Bui Pho
(74) *Attorney, Agent, or Firm* — Oliff & Berridge, PLC

(57) ABSTRACT

An illumination apparatus includes a light source device adapted to emit light having an asymmetric intensity distribution and a polarization conversion element adapted to align polarization states of the light emitted from the light source device. The polarization conversion element includes a splitting section adapted to split incident light input from the light source device into transmitted light and reflected light having the polarization states different from each other in a direction in which an intensity distribution of the incident light is asymmetric, a conversion section adapted to convert the polarization state of one of the transmitted light and the reflected light into the polarization state of the other of the transmitted light and the reflected light, and a mirror system.

11 Claims, 7 Drawing Sheets

ILLUMINATION APPARATUS, PROJECTOR, AND POLARIZATION CONVERSION ELEMENT

BACKGROUND

1. Technical Field

The present invention relates to an illumination device, a projector, and a polarization conversion element.

2. Related Art

In the past, a projector has been known as one of the devices capable of displaying a large-screen image. Projectors are provided with an illumination apparatus, an image formation apparatus, a projection lens, and so on. The illumination light emitted from the illumination apparatus is turned to image light representing the image by the image formation apparatus. The image light is enlargedly projected by the projection lens, and thus the large-screen image can more easily be obtained compared to direct-view image display devices.

As the illumination apparatus used for projectors or the like, there is known an apparatus provided with a lamp light source and a reflector. The reflector is formed of a part of a spheroid or a paraboloid having the focal point at the lamp light source. The light radially emitted from the lamp light source is reflected by the reflector, and proceeds in a direction along the illumination light axis. In general, the shape of the lamp light source and the shape of the reflector are arranged to be axisymmetric around the illumination light axis, and the light emitted from the illumination apparatus ideally has an axisymmetric intensity distribution.

Incidentally, enhancement of image quality and miniaturization of the apparatus are required for the projectors. As a technology effective for miniaturizing the apparatus for the projector, there can be cited a technology disclosed in JP-A-2003-16802 (a related art document). An illumination optical system (an illumination apparatus) of the related art document is provided with a light emitting section mainly composed of a first concave mirror, a second concave mirror, and a light source.

The light emitted from the light source toward the first concave mirror is reflected by the first concave mirror and then proceeds toward the second concave mirror. The light emitted from the light source toward the second concave mirror and the light reflected by the first concave mirror are emitted from the light emitting section. The light emitted from the light emitting section reaches an object to be illuminated, via an integrator for equalizing the density of the light beam, and so on.

For example, if it is arranged that the area to which the light is emitted from the light source is divided into two parts, and the second concave mirror reflects and folds the light emitted to one of the two parts, the cross-sectional area of the light beam emitted from the light emitting section becomes approximately a half thereof. Thus, the optical components disposed between the light emitting section and the object to be illuminated can be miniaturized, and the projector can also be miniaturized.

Although it is conceivable that the projector can be miniaturized using the technology of the related art document, there is a problem that the uniformity of the illuminance distribution on the illuminated object is degraded. This is because the light radially emitted from the light source is emitted from one of the two parts into which the area is divided, and thus the symmetry of the intensity distribution of the light emitted from the light source apparatus with respect to the boundary between the divisional parts is degraded. If the symmetry of the intensity distribution of the light emitted from the illumination apparatus is degraded, the uniformity of the illuminance distribution is degraded on the illuminated object, and in the case in which the illuminated object is an image forming apparatus, for example, since the image light formed fails to have a desired grayscale, the image quality is problematically degraded. Further, the light efficiency in the optical components disposed between the illumination apparatus and the illuminated object might be degraded.

SUMMARY

An advantage of some aspects of the present invention is to provide an illumination apparatus capable of obtaining light with an even intensity distribution. Further, another advantage of some aspects of the invention is to provide a projector capable of obtaining a high quality image while keeping the small size. Further, another advantage of some aspects of the invention is to provide a polarization conversion element capable of preferably equalizing the intensity distribution of the light and aligning the polarization states of the light.

An illumination apparatus according to an aspect of the invention includes a light source device adapted to emit light having an asymmetric intensity distribution, and a polarization conversion element adapted to align polarization states of the light emitted from the light source device, wherein the polarization conversion element includes a splitting section adapted to split incident light input from the light source device into transmitted light and reflected light having the polarization states different from each other in a direction in which an intensity distribution of the incident light is asymmetric, and a conversion section adapted to convert the polarization state of one of the transmitted light and the reflected light (hereinafter referred to as one light) into the polarization state of the other of the transmitted light and the reflected light (hereinafter referred to as the other light), a mirror system adapted to emit the other light and the one light, which is converted by the conversion section, from the polarization conversion element in substantially the same direction is configured to include the splitting section, and the mirror system is disposed so that the direction, in which the intensity distribution of the one light emitted from the polarization conversion element is asymmetric, is reversed with respect to a direction, in which the intensity distribution of the other light emitted from the polarization conversion element is asymmetric.

According to this aspect of the invention, the transmitted light and the reflected light are split in the direction in which the intensity distribution of the incident light is asymmetric, and the one light emitted from the polarization conversion element has the direction, in which the intensity distribution is asymmetric, reversed with respect to the other light emitted from the polarization conversion element. Therefore, the intensity distribution of the entire light emitted from the polarization conversion element becomes a symmetric intensity distribution having the symmetry center between the light axis of the transmitted light and the light axis of the reflected light.

As described above, according to the aspect of the invention, since the symmetric property of the intensity distribution of the light emitted from the illumination apparatus is improved, it becomes possible to illuminate the illuminated area uniformly. Since the light efficiency in the optical elements such as a lens disposed between the illumination apparatus and the illuminated area is improved, a substantively efficient illumination apparatus can be achieved. If it is used as the illumination apparatus for illuminating the image forming device for forming an image using the polarized light, since the polarization states of the light emitted from the illumination apparatus are aligned, the light can be used for illumination without waste, and a highly efficient illumination apparatus can be obtained.

Further, it is preferable that a difference between the number of times of reflection of the one light inside the polarization conversion element and the number of times of reflection of the other light inside the polarization conversion element is an odd number.

If the difference between the number of times of the reflection of the one light and the number of times of the reflection of the other light is an odd number, the image by the one light is reversed with respect to the image by the other light, and accordingly, the intensity distributions of the light becomes symmetric in the image by the one light and the other light. It should be noted that the number of times of reflection of the light not reflected is assumed to be zero (an even number). For example, in the case of the configuration in which the one light is not reflected, the number of times of reflection of the one light is zero. In this case, it is enough to adjust the number of reflecting surfaces included in the mirror system so that the number of times of the reflection of the other light becomes an odd number.

Further, it is preferable that a reflecting surface adapted to reflect at least one of the one light and the other light inside the polarization conversion element is disposed so that a normal direction of the reflecting surface and the direction in which the intensity distribution of the incident light is asymmetric are substantially coplanar with each other.

According to this aspect of the invention, every time the light is reflected by the reflecting surface, the image by the light is reversed in the direction in which the intensity distribution of the incident light is asymmetric. Therefore, by adjusting the number of times of the reflection, the image by the one light can be reversed with respect to the image by the other light.

Further, the conversion section can be configured to include a reflecting member adapted to reflect and fold the transmitted light transmitted through the splitting section, and a quarter wave plate disposed between the reflecting member and the splitting section.

The transmitted light input from the splitting section to the conversion section is reflected and folded by the reflecting member and reenters the splitting section. By passing through the quarter phase plate two times between the splitting section and the reflecting member, the polarization direction of the transmitted light reentering the splitting section is rotated approximately 90°, and the transmitted light turns to the S polarized light, and is reflected by the splitting section.

At the time point after passing through the splitting section and then being reflected by the splitting section, the transmitted light is reflected two times. The reflected light reflected by the splitting section is reflected once at the time point when being reflected by the splitting section. The difference in the number of times of reflection between the transmitted light and the reflected light is an odd number (once) at the time point when each of them is reflected by the splitting section, and moreover, the transmitted light and the reflected light proceed on the same light axis in the directions opposite to each other. Therefore, the mirror system for emitting the transmitted light and the reflected light in substantially the same direction can easily be configured. Further, since the transmitted light and the reflected light are both reflected one or more times, it becomes possible to adjust the difference in the light path length in the polarization conversion element between the transmitted light and the reflected light.

Further, it is preferable that a converging optical system adapted to converge the light emitted from the light source device to the splitting section of the polarization conversion element is provided.

According to this aspect of the invention, since the light source light emitted from the light source device is converged by the converging optical system to the splitting section, the polarization states of almost entire light source light are aligned, and the light source light is emitted from the polarization conversion element with the improved asymmetric property in the intensity distribution. Since the loss of the light due to the fact that a part of the light source light enters an unexpected location other than the splitting section and so on can significantly be reduced, it becomes possible to use almost entire light source light for illumination, and the light efficiency can be enhanced.

Further, the light source device preferably includes a light source adapted to emit light, a first reflector disposed so as to surround a first part of the light source and adapted to reflect the light emitted from the light source, and a second reflector disposed so as to surround at least a second part of the light source different from the first part of the light source and adapted to reflect the light, which is emitted from the light source, toward the first reflector.

According to this aspect of the invention, the light emitted from the light source to the second reflector is emitted from the light source device via the first reflector. Therefore, the light intensity obtained from the light source device becomes irrelevant to the size of the second reflector, and the second reflector can be miniaturized without reducing the intensity of the light obtained from the light source device.

Further, the light emitted from the light source device becomes to have a small cross-sectional area of the light beam perpendicular to the light axis compared to the case in which the light is emitted directly from the second reflector. Therefore, the density of the light emitted from the light source device is increased, and thus the illuminance in the illuminated area can be increased.

Further, it is preferable that the splitting section is formed of a polarization beam splitter.

According to the polarization beam splitter (PBS), the transmitted light is separated from the reflected light with high accuracy, and it is dramatically reduced that the reflected light is mixed with the transmitted light thus separated. Therefore, it is dramatically reduced that undesired polarized light is emitted from the illumination apparatus due to the conversion of the polarization state of the reflected light mixed with the transmitted light, and the illumination apparatus capable of providing the desired polarized light can be achieved.

Further, the polarization conversion element preferably includes a plurality of polarization conversion units each configured to include the splitting section, the conversion section, and the mirror system, and the polarization conversion element preferably includes an overlapping optical system adapted to overlap light beams emitted from the respective polarization conversion units with each other in an illuminated area.

According to this aspect of the invention, the light emitted from the light source device enters a plurality of polarization conversion units in a spatially-divided manner, and the plurality of light beams converted by the respective polarization converting units is overlapped (integrated) in the illuminated area by the overlapping element. Therefore, the spatial variation of the intensity distribution of the light emitted from the light source device is dramatically reduced in the illuminated area, and the illuminance distribution in the illuminated area is uniformized.

A projector according to another aspect of the invention includes the illumination apparatus according to the aspect of the invention, an image forming device adapted to form image light representing an image with light emitted from the illumination apparatus, and a projection device adapted to project the image light formed by the image forming device.

As described above, according to this aspect of the invention, since the illuminance distribution in the illuminated area becomes dramatically even, the grayscale of the image light emitted from the image forming device can be controlled with high accuracy, and the projector capable of obtaining a high quality projection image can be realized.

A polarization conversion element according to still another aspect of the invention includes a splitting section adapted to split incident light with an asymmetric intensity distribution into transmitted light and reflected light having the polarization states different from each other in a direction in which the intensity distribution of the incident light is asymmetric, and a conversion section adapted to convert the polarization state of one of the transmitted light and the reflected light (hereinafter referred to as one light) into the polarization state of the other of the transmitted light and the reflected light (hereinafter referred to as the other light), wherein a mirror system adapted to emit the other light and the one light, which is converted by the conversion section, in substantially the same direction is configured to include the splitting section, a reflecting surface included in the mirror system is disposed so that a direction in which an intensity distribution of the one light emitted from the mirror system is asymmetric is reversed with respect to a direction in which an intensity distribution of the other light emitted from the mirror system is asymmetric, and the mirror system is arranged such that the one light is reflected by the mirror system one or more times, the other light is reflected by the mirror system one or more times, and a difference between the number of times of reflection of the one light in the mirror system and the number of times of reflection of the other light in the mirror system is an odd number.

According to this aspect of the invention, the asymmetric property in the intensity of the light emitted from the polarization conversion element can be weakened as a whole compared to the light before entering the polarization conversion element on the same ground as is explained with respect to the illumination apparatus according to the aspect of the invention described hereinabove.

Incidentally, in the case in which the one light is emitted from the polarization conversion element without being reflected, the light path length of the other light becomes longer than the light path length of the one light. However, in the polarization conversion element according to this aspect of the invention, since the number of times of reflection of the one light and the number of times of reflection of the other light are both one or more times, it becomes easy to adjust the light path length of the one light and the light path length of the other light, and it becomes possible to make the light path length the same between the one light and the other light. Thus, it becomes possible, for example, to align the extent of attenuation of the transmitted light and the extent of attenuation of the reflected light, or to avoid a harmful influence due to the interference between the transmitted light emitted from the polarization conversion element and the reflected light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
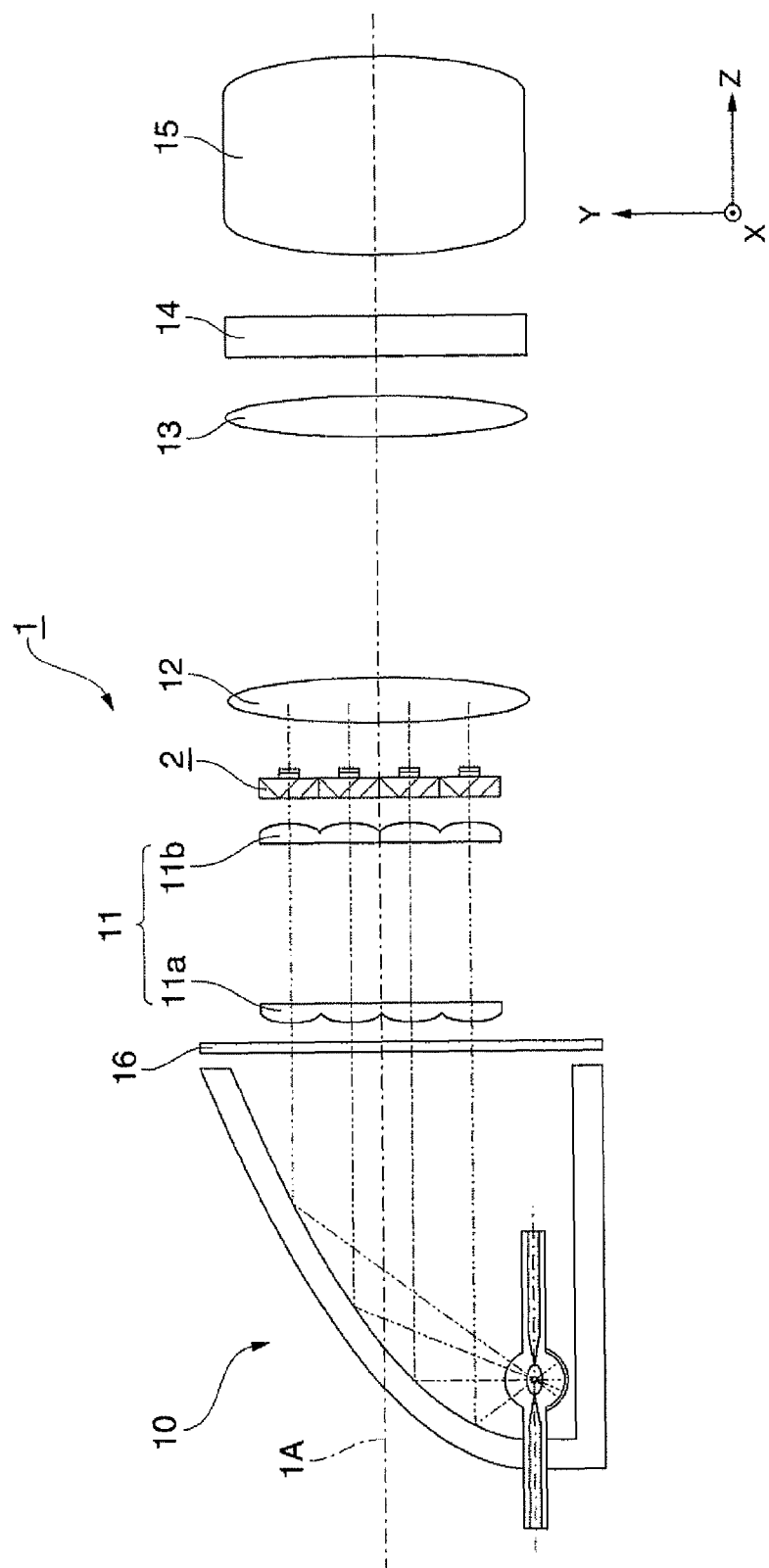
FIG. 1 is a schematic diagram showing a general configuration of an illumination apparatus according to a first embodiment of the invention.

Hereinafter, some embodiments of the invention will be explained with reference to the accompanying drawings. In the drawings used in the explanations, the dimensions and the scale sizes of various structures may be made different from those of the actual structures in order for providing a clear view of each of the structures.

First Embodiment

FIG. 1 is a schematic diagram showing a general configuration of an illumination apparatus 1 according to a first embodiment.

As shown in FIG. 1, the illumination apparatus 1 is provided with a light source device 10, an illuminance equalizing optical system (a converging optical system) 11, a polarization conversion element 2, and a condenser lens (an overlapping optical system) 12. An illumination light axis 1A as a light axis of the illumination apparatus 1 is substantially identical to a light axis of the light source device 10. The light source light emitted from the light source device 10 proceeds along the illumination light axis 1A, and illuminates an area to be illuminated (hereinafter referred to as an illuminated area) after passing through the illuminance equalizing optical system 11, a polarization conversion element 2, and the condenser lens 12 in this order.

In the present embodiment, it is arranged that the light emitted from the illumination apparatus 1 is collimated by a field lens 13, and then illuminates a transmissive liquid crystal light valve (the illuminated area) 14. Here, the planar shape of the illuminated area projected on a plane perpendicular to the illumination light axis 1A is arranged to be substantially rectangular. The light entering the liquid crystal light valve 14 is modulated by the liquid crystal light valve 14, and forms image light representing an image. The projection lens 15 enlargedly projects the image light on a screen not shown, thereby obtaining a projection image. Here, a filter 16 is disposed on a light path between the light source device 10 and the illuminance equalizing optical system 11. The filter 16 is for removing the light unnecessary for the projection image, such as ultraviolet radiation or infrared radiation.

Hereinafter, setting the XYZ Cartesian coordinate system shown in FIG. 1, the positional relationship between the various constituents will be explained based thereon. In the XYZ Cartesian coordinate system, a direction parallel to the illumination light axis 1A is defined as the Z direction, and two directions perpendicular to the Z direction are defined as the X direction and the Y direction, respectively. Although described later in detail, the light source device 10 of the present embodiment is arranged to emit light, which is emitted from the lamp light source and then reflected by the reflector. The shape of the reflector is arranged to be symmetric in the X direction, and asymmetric in the Y direction.

Figure 2:
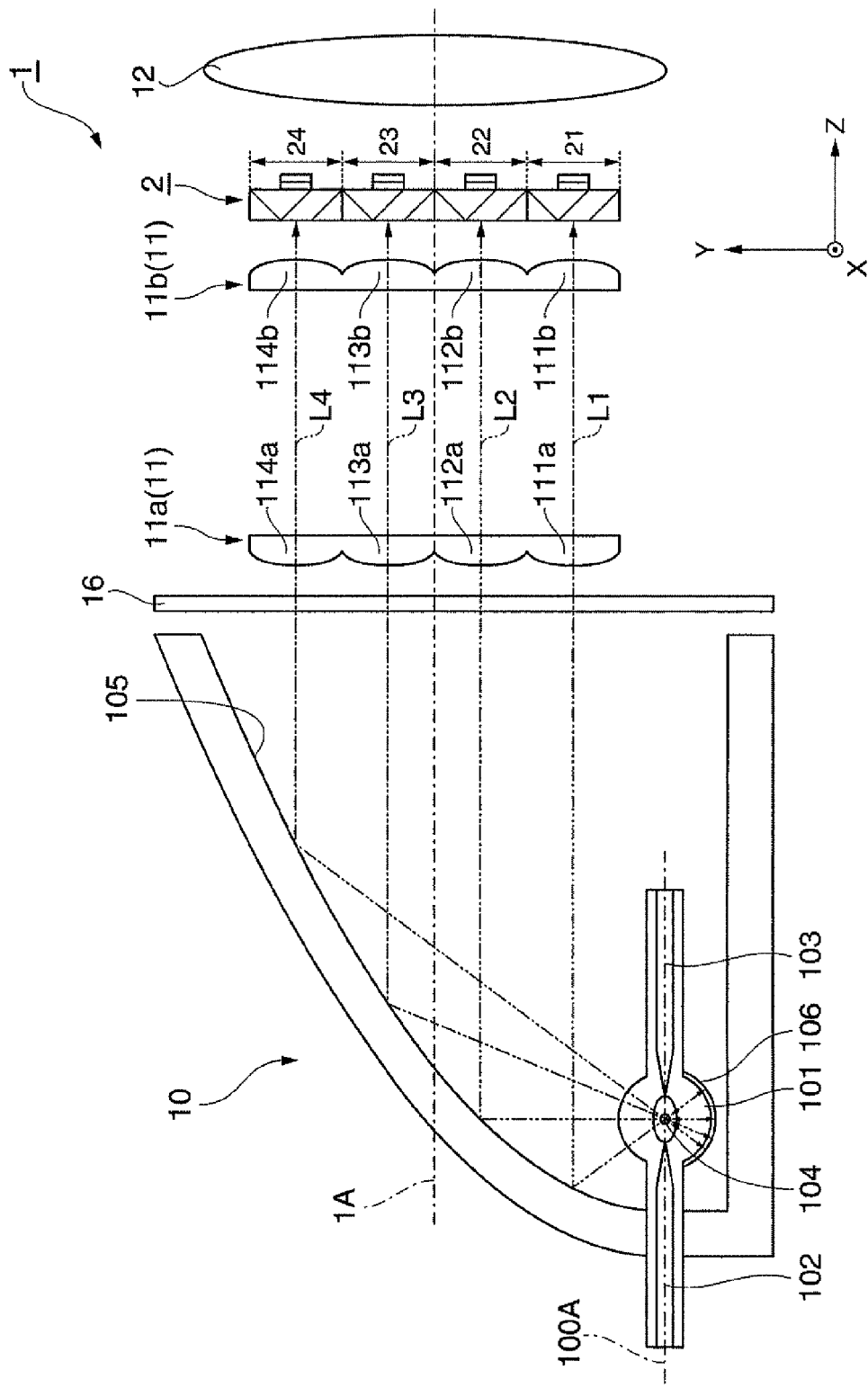
FIG. 2 is a schematic diagram enlargedly showing the illumination apparatus according to the first embodiment.

FIG. 2 is a schematic diagram enlargedly showing the illumination apparatus 1 according to the first embodiment. The light source device 10 of the present embodiment has the light source for emitting light and the reflector for reflecting the light emitted from the light source. As the light source, there can be adopted a lamp light source such as a high-pressure mercury lamp, metal halide lamp, or a xenon lamp, or a solid-state light source such as a light emitting diode, and the lamp light source is adopted in the present embodiment.

The lamp light source according to the present embodiment is disposed so as to extend in a direction along the lamp axis 100A parallel to the illumination light axis 1A. The lamp light source has a structure of encapsulating a pair of electrodes 102, 103 made of tungsten inside the light emitting tube 101. The electrodes 102, 103 extend inside the light emitting tube 101 in a direction along the lamp axis 100A. The light emitting tube 101 is mainly composed of a spherical portion centered on the midsection between the electrodes 102, 103 and tubular portions extending along the lamp axis 100A so as to clad the electrodes 102, 103, respectively.

It is arranged that when applying a voltage between the electrodes 102, 103, substantially radiated light is caused between the electrodes 102, 103. The lamp light source can be assumed to be a point light source having the light emitting point 104 at the barycentric position of the luminance of the light thus generated.

The reflector of the present embodiment is mainly composed of a first reflector 105 and a second reflector 106. The shape of the reflecting surface of the first reflector 105 is a part of a paraboloidal surface.

The paraboloidal surface is a curved surface drawn by rotating a parabola, which has the light emitting point 104 as a focal point and the lamp axis 100A as a central axis, around the lamp axis 100A. One (on the Y direction side) of the curved surfaces obtained by dividing the paraboloidal surface into two areas straddling the plane (the XZ plane) including the lamp axis 100A forms the reflecting surface of the first reflector 105.

The shape of the reflecting surface of the second reflector 106 is formed as a part of a spherical surface centered on the light emitting point 104. One (on the Y direction side) of the curved surfaces obtained by dividing the spherical surface into two areas straddling the plane (the XZ plane) including the lamp axis 100A forms the reflecting surface of the second reflector 106. Here, a film made of a reflecting material is formed on the surface of the spherical portion of the light emitting tube 101, and the reflecting film thus formed forms the reflecting surface of the second reflector 106. It should be noted that the second reflector can be disposed independently of the light emitting tube 101.

In the light source device 10 having the configuration described above, the light emitted from the light emitting point 104 toward the second reflector 106 is reflected and folded by the second reflector 106, and then enters the first reflector 105 after passing through the light emitting point 104. The light emitted from the light emitting point 104 directly toward the first reflector 105 and the light emitted from the light emitting point 104 to the first reflector 105 indirectly via the second reflector 106 are input to the first reflector 105. Since the light input to the first reflector 105 has passed through the focal point (the light emitting point 104) of the paraboloidal surface, the light input to the first reflector 105 is emitted from the light source device 10 as substantially parallel light.

Figure 3A:
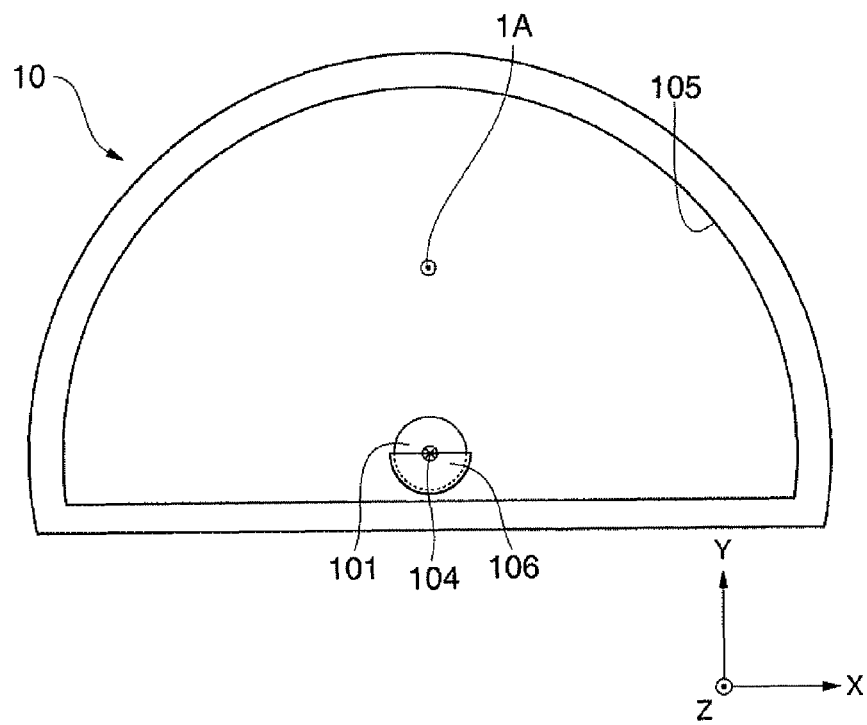
FIG. 3A is a front view of a light source device.
Figure 3B:
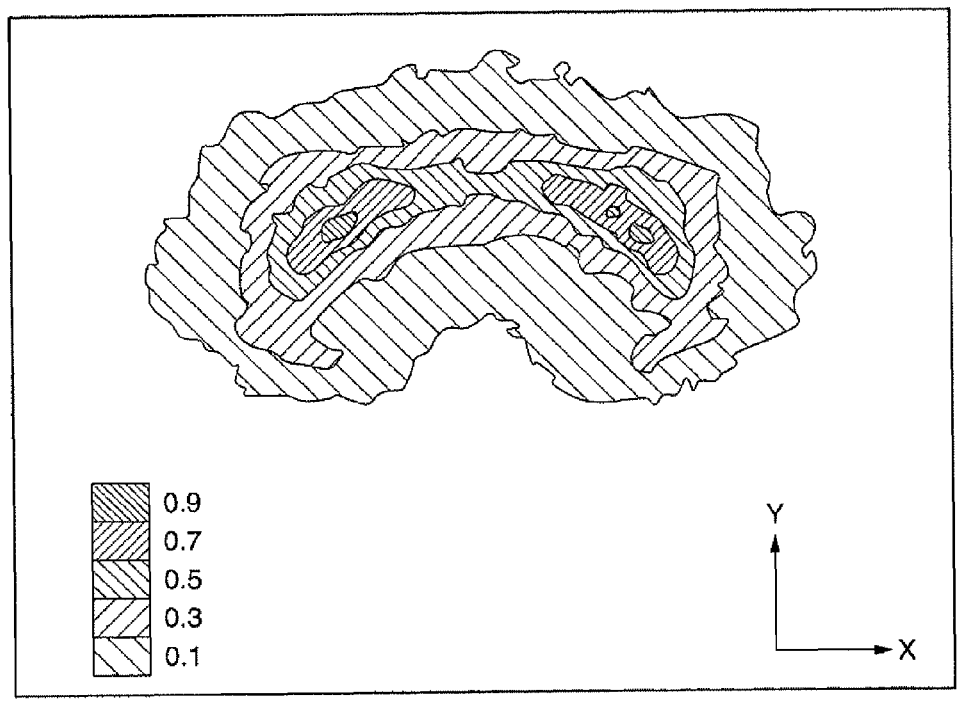
FIG. 3B is a graph showing the intensity distribution of the light source light.

FIG. 3A is a front view of the light source device 10 when observing the light source device 10 from the illumination light axis 1A, and FIG. 3B is a graph showing an example of the intensity distribution of the light emitted from the light source device 10. It should be noted that the graph of FIG. 3B shows the intensity distribution of the light on the plane perpendicular to the illumination light axis 1A with standardized values.

In the present embodiment, as shown in FIG. 3A, the shape obtained by projecting the first reflector 105 on the plane perpendicular to the illumination light axis 1A is a substantially semicircular shape, and the shape obtained by projecting the second reflector 106 on this plane is also a substantially semicircular shape. The shape of the first reflector 105 is axisymmetric with respect to an axis, which passes through the light emitting point 104 and is parallel to the X direction, as the axis of symmetry. Further, the shape of the first reflector 105 is asymmetric with respect to an axis, which passes through the light emitting point 104 and is parallel to the X direction.

According to such a light source device 10, since the light emitted toward the second reflector 106 is taken out via the first reflector 105, almost entire light emitted from the light emitting point 104 can be taken out without disposing the first reflector in the area hidden behind the second reflector 106 from the light emitting point 104.

Since it is enough for the second reflector 106 to have a function of folding the light from the light emitting point 104, plainly speaking, the dimension of the second reflector 106 can be made substantially the same as that of the spherical portion of the light emitting tube 101. Therefore, the light source device 10 can significantly be miniaturized compared to the case in which the reflector (hereinafter also referred to as a whole circumference reflector) is formed of a paraboloidal surface surrounding the whole circumference of the light emitting point in the plane perpendicular to the illumination light axis.

Further, the area of the cross-section of the light beam (the light source light), which is emitted from the light source device 10, perpendicular to the illumination, light axis 1A becomes dramatically smaller compared to the case of the whole circumference reflector, and in the present embodiment, the cross-sectional area becomes a half thereof, for example. Thus, since the dimension of the area, to which the light source light is input, in the optical component disposed between the light source device 10 and the illuminated area is decreased, the optical component can be miniaturized.

Further, since the cross-sectional area of the light source light is significantly reduced on the one side, and the amount of the light taken out from the light source device 10 is substantially the same level as the light intensity obtained by the light source device formed of the whole circumference reflector on the other hand, the density of the light source light is increased.

On the other hand, since the light source light is taken out via the first reflector 105, and the first reflector 105 has asymmetric shape, the intensity distribution of the light emitted from the light source device 10 becomes asymmetric. As shown in FIG. 3B, although the intensity distribution of the light source light from the light source device 10 has an axisymmetric property in the X direction, the axisymmetric property thereof in the Y direction is lost. It should be noted that the symmetric property of the intensity distribution can be evaluated using the following method.

Firstly, the intensity distribution of the light source light shown in FIG. 3B is obtained. The intensity distribution can be obtained by performing, for example, multipoint measurement of the illuminance per unit area in the plane perpendicular to the light axis of the light source device, or a numerical simulation thereof. Subsequently, the direction (e.g., the X direction) along which the symmetric property is evaluated is determined, and then the integral value of the intensity distribution in the Y direction is obtained correspondingly to an X coordinate arbitrarily selected within the area to be the evaluation object. By obtaining the integral value of the intensity distribution corresponding to the X coordinate while varying the X coordinate, the distribution of the integral values in the X direction can be obtained. By, for example, performing various statistical processing on the distribution of the integral values thus obtained, the symmetric property in the X direction can be evaluated. As the various statistical processing, there can be cited a process of detecting a peak value of the integral values, and then evaluating the half width at half maximum on each side across the peak value, and so on.

For example, when plotting the integral values correspondingly to the X coordinates using the data shown in FIG. 3B, symmetric peaks appear on the both sides across the illumination light axis 1A in the X direction in the graph thus plotted. According to the fact described above, it is understood that the intensity distribution of the light emitted from the light source device 10 is symmetric in the X direction. Further, according to the evaluation of the symmetric property in the Y direction, a single peak of the integral values obtained by integration along the X direction exists in the Y direction, and the gradient in the distribution of the integral values is different between the both sides across the peak. According to the fact described above, it is understood that the intensity distribution of the light emitted from the light source device 10 is asymmetric in the Y direction.

Going back to the explanation of FIG. 2, the illuminance equalizing optical system 11 is mainly composed of a first fly-eye lens array 11a and a second fly-eye lens array 11b. The first fly-eye lens array 11a has a plurality of lens sections 111a through 114a. The second fly-eye lens array 11b has a plurality of lens sections 111b through 114b. A planar shape of each of the lens sections 111a through 114a and 111b through 114b projected on a plane perpendicular to the illumination light axis 1A is a substantially rectangular shape similar to, for example, the planar shape of the illuminated area.

The polarization conversion element 2 of the present embodiment has a plurality of polarization conversion units 21 through 24.

One of the lens sections 111a through 114a, one of the lens sections 111b through 114b, and one of the polarization conversion units 21 through 24 aligned on an axis parallel to the illumination light axis 1A correspond to each other, and those corresponding to each other form a group. For example, the lens section 111a of the first fly-eye lens array 11a, the lens section 111b of the second fly-eye lens array 11b, and the polarization conversion unit 21 correspond to each other, and they form a group.

The light emitted from the light source device 10 passes through the filter 16, and then enters the first fly-eye lens array 11a in a spatially-separated manner. The light beams L1 through L4 spatially separated from each other enter the respective groups of optical system described above. For example, the light beam L1 input to the lens section 111a is converged in the entrance area of the polarization conversion unit 21 via the lens section 111b. The light beams L1 through L4 spatially separated from each other are overlapped with each other in the illuminated area by the condenser lens 12 after passing through the corresponding polarization conversion units 21 through 24.

As the polarization conversion element 2 of the present embodiment, the polarization conversion element according to the invention is applied. Hereinafter, the embodiment of the invention related to the polarization conversion element will be explained in detail.

Figure 4A:
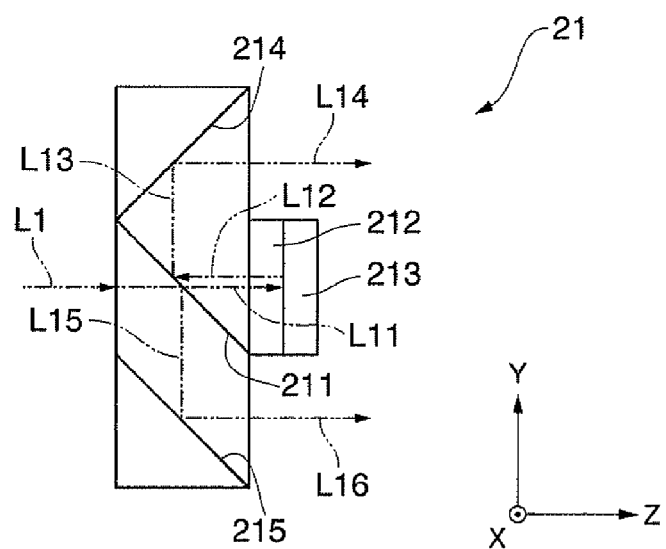
FIG. 4A is an enlarged view of a polarization conversion element according to the embodiment of the invention.
Figure 4B:
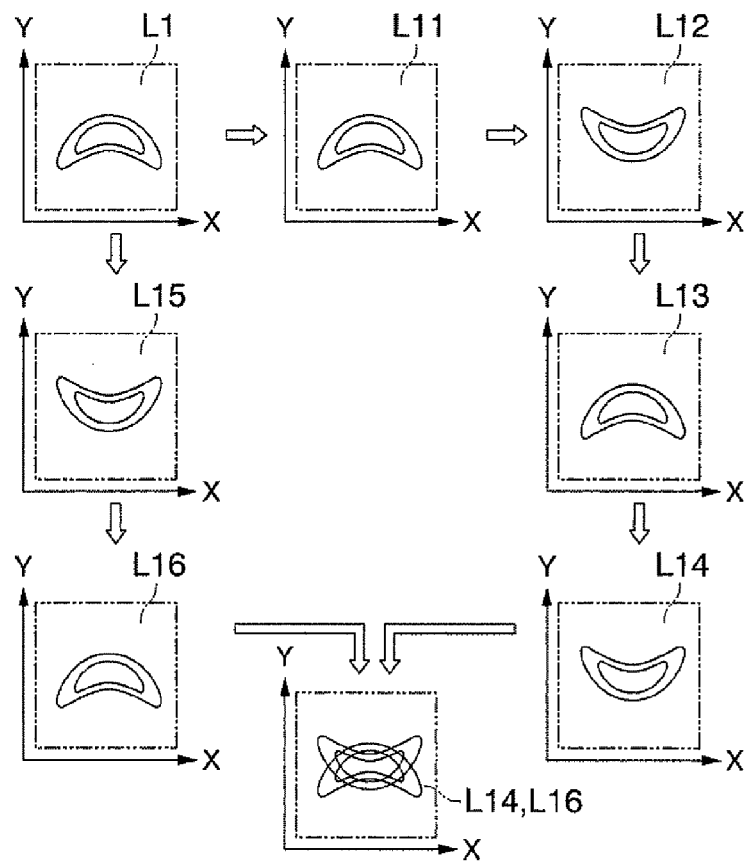
FIG. 4B is a conceptual diagram of the intensity distribution.

FIG. 4A is a schematic diagram enlargedly showing the polarization conversion unit 21 of the polarization conversion element 2, and FIG. 4B is a conceptual diagram showing the variation of the intensity distribution of the light in the polarization conversion unit 21. It should be noted that although FIG. 4A shows only the polarization conversion unit 21, the polarization conversion units 22 through 24 each have the same configuration as that of the polarization conversion unit 21.

As shown in FIG. 4A, the polarization conversion unit 21 has a polarization beam splitter film (a PBS film) 211, a quarter phase plate 212, a reflecting member 213, and reflecting films 214, 215. The PBS film 211, the reflecting member 213, and the reflecting films 214, 215 form a mirror system.

The PBS film 211 functions as a splitting section. The PBS film 211 forms an entrance area of the polarization conversion unit 21, and the light beam L1 having passed through the lens sections 111a, 111b is converged on the PBS film 211. The PBS film 211 is arranged to be substantially parallel to the axis substantially perpendicular to both of the direction (the Y direction) in which the intensity distribution of the light entering the polarization conversion element 2 is asymmetric, and the direction (the Z direction) along the illumination light axis 1A. The PBS film 211 of the present embodiment is disposed so as to be substantially parallel to the X direction and to form an angle of about 45° with respect to the illumination light axis 1A.

The PBS film 211 has a property of transmitting the P polarized light to the PBS film 211 out of the light beam L1, and at the same time reflecting the S polarized light to the PBS film 211 out of the light beam L1. In other words, the light beam L11 immediately after passing through the PBS film 211 is P polarized light (polarization state), and the light beam L15 immediately after reflected by the PBS film 211 is S polarized light (polarization state). Hereinafter, the P polarized light to the PBS film 211 might be referred to simply as P polarized light, and the S polarized light to the PBS film 211 might be referred to simply as S polarized light.

The quarter phase plate 212 is grouped with the reflecting member 213, and functions as a conversion section together therewith. The quarter phase plate 212 is disposed apart from the PBS film 211 in the direction along the illumination light axis 1A. The reflecting member 213 is disposed in the direction along the illumination light axis 1A between the PBS film 211 and the quarter phase plate 212. Here, the quarter phase plate 212 and the reflecting member 213 are both disposed so as that the surface thereof to which the light is input is substantially perpendicular to the illumination light axis 1A.

It should be noted that it is also possible to use a phase plate with a retardation value different from that of the quarter phase plate 212 instead of the quarter phase plate 212. The phase plate is only required to have a property of modifying the polarization state of the light so that the polarization direction of the light after passing through the phase plate two times is substantially perpendicular to the polarization direction of the light before entering the phase plate.

The light beam L11 transmitted through the PBS film 211 passes through the quarter phase plate 212, and is then reflected and folded by the reflecting member 213. The light beam L12 reflected by the reflecting member 213 passes through the quarter phase plate 212, and then enters the PBS film 211 again. In other words, the transmitted light transmitted through the PBS film is rotated approximately 90° in the vibration direction while passing through the quarter phase plate 212 two times before entering the PBS film 211 again. Thus, the light beam L11 enters the PBS film 211 again as the light beam L12 with the polarization state converted to S polarized light.

The light beam L12 having reentered the PBS film 211 is reflected by the PBS film 211 and folded approximately 90° in the light axis. The light beam L13 reflected by the PBS film 211 then enters the reflecting film 214. The reflecting film 214 is disposed so as to be substantially perpendicular to the PBS film 211, and forms an angle of approximately 45° with the illumination light axis 1A. The light beam L13 having entered the reflecting film 214 is reflected by the reflecting film 214 and folded approximately 90° in the light axis. The light beam L14 reflected by the reflecting film 214 is emitted from the polarization conversion unit 21 in the direction along the illumination light axis 1A.

On the other hand, the light beam L15 out of the light beam L1, reflected by the PBS film 211 is reflected by the PBS film 211, and is folded approximately 90° in the light axis, and then enters the reflecting film 215. The reflecting film 215 is disposed so as to be substantially parallel to the PBS film 211, and forms an angle of approximately 45° with the illumination light axis 1A. The light beam L15 having entered the reflecting film 215 is reflected by the reflecting film 215 and folded approximately 90° in the light axis. The light beam L16 reflected by the reflecting film 215 is emitted from the polarization conversion unit 21 in the direction along the illumination light axis 1A.

As described hereinabove, a first path in the polarization conversion unit 21 through which the transmitted light passes is composed of a path from the incident end surface of the polarization conversion unit 21 to the PBS film 211, a path from the PBS film 211 to the reflecting member 213, a path from the reflecting member 213 to the PBS film 211, a path from the PBS film 211 to the reflecting film 214, and a path from the reflecting film 214 to the emission end surface of the polarization conversion unit 21.

A second path in the polarization conversion unit 21 through which the reflected light passes is composed of a path from the incident end surface of the polarization conversion unit 21 to the PBS film 211, a path from the PBS film 211 to the reflecting film 215, and a path from the reflecting film 215 to the emission end surface of the polarization conversion unit 21.

In the polarization conversion unit 21 with the configuration as described above, the light beam L1 entering the polarization conversion unit 21 is split in the direction (the Y direction) in which the intensity distribution of the light beam is asymmetric, and emitted in substantially the same direction (the Z direction) with the polarization states of the light beams thus split aligned with each other. As described above, the mirror system for emitting the transmitted light and the reflected light, which are aligned in the polarization state with each other, in substantially the same direction is mainly composed of the reflecting surfaces of the PBS film 211, the reflecting member 213, and the reflecting films 214, 215.

In the first path, the transmitted light is reflected once at each of the reflecting member 213, the PBS film 211, and the reflecting film 214 in this order, and the number of times of reflection of the transmitted light in the first path is three (an odd number). In the second path, the reflected light is reflected once at each of the PBS film 211 and the reflecting film 215 in this order, and the number of times of reflection of the reflected light in the second path is two (an even number). Since the difference in the number of times of reflection between the transmitted light and the reflected light is arranged to be an odd number (once here), the light beam emitted from the polarization conversion unit has the intensity distribution with an asymmetric property weakened as a whole compared to the light beam L1.

Hereinafter, the mechanism for weakening the asymmetric property will be explained.

As shown in FIG. 3B, the intensity distribution of the light emitted from the light source device 10 is arranged to be asymmetric in the Y direction, and the intensity distribution of the light beam L1 entering the polarization conversion unit 21 is also arranged to be asymmetric in the Y direction. Since each of the PBS film 211, the reflecting member 213, the reflecting films 214, 215 has the reflecting surface parallel to the X direction, the intensity distribution of the light beam reflected by each of the reflecting surfaces is reversed with respect to the axis parallel to the X direction.

Specifically, as shown in FIG. 4B, the light beam L11 out of the light beam L1 has substantially the same intensity distribution as that of the light beam L1 at the time point immediately after the light beam L11 has passed through the PBS film 211. When the light beam L11 is reflected by the reflecting member 213, the light beam L12 obtained by the reflection becomes to have an intensity distribution obtained by reversing the intensity distribution of the light beam L1. Subsequently, when the light beam L12 is reflected by the PBS film 211, the light beam L13 obtained by the reflection becomes to have an intensity distribution obtained by reversing the intensity distribution of the light beam L1 two times, namely the same intensity distribution as that of the light beam L1. Subsequently, when the light beam L13 is reflected by the reflecting film 214, the light beam L14 obtained by the reflection becomes to have an intensity distribution obtained by reversing the intensity distribution of the light beam L1.

Meanwhile, the light beam L15 out of the light beam L1 becomes to have an intensity distribution obtained by reversing the intensity distribution of the light beam L1 at the time point of the reflection by the PBS film 211. Subsequently, when the light beam L15 is reflected by the reflecting film 215, the light beam L16 obtained by the reflection becomes to have an intensity distribution obtained by reversing the intensity distribution of the light beam L1 two times, namely the same intensity distribution as that of the light beam L1.

After all, the intensity distribution of the light beam L14 is arranged to be the distribution obtained by reversing the intensity distribution of the light beam L16 with respect to the axis parallel to the X direction. Since the light beam L14 and the light beam L16 are emitted so as to be arranged side by side in the Y direction, the light beam emitted from the polarization conversion unit 21 is arranged to have an intensity distribution symmetric with respect to the axis parallel to the X direction as a whole. The light beam having such light beams L14, L16 overlapped with each other in the illuminated area is dramatically improved in the symmetric property in the Y direction compared to the case of the light beam L1. Further, regarding the light beams L2 through L4 entering the respective polarization conversion units 22 through 24, the symmetric property in the Y direction is dramatically improved in the same manner.

In the illumination apparatus 1 of the first embodiment described above, since the light source device using the reflector divided into the first reflector 105 and the second reflector 106 is adopted, the illumination apparatus 1 can be made smaller compared to the apparatus with the light source device using the whole circumference reflector. Further, since the density of the light emitted from the light source device 10 becomes higher than in the case of the light source device using the whole circumference reflector, the illuminance in the illuminated area increases.

Further, since the light source light emitted from the light source device 10 is spatially divided and then overlapped with each other in the illuminated area, the illuminance distribution in the illuminated area becomes even. Regarding each of the divisional light beams obtained by dividing the light source light, the symmetric property of the intensity distribution is improved by the polarization conversion element 2. Therefore, the illuminance distribution in the illuminated area becomes dramatically even, and further, the light efficiency can be enhanced in the optical element such as the condenser lens 12 disposed between the polarization conversion element 2 and the illuminated area.

Further, in the polarization conversion element explained as the first embodiment of the invention, since the difference in the number of times of reflection between the transmitted light and the reflected light is arranged to be an odd number, the symmetric property of the light emitted from the polarization conversion element 2 is improved compared to that before entering. Further, since one or more reflecting surface is disposed on the first path along which the transmitted light transmitted through the polarization splitting section passes, and the number of times of reflection of the transmitted light is one or more, it is possible to adjust the difference in the light path length between the second path and the first path.

For example, in the polarization conversion element 2 shown in FIG. 4A, the light path length of the first path is a round trip distance between the PBS film 211 and the reflecting member 213 longer than the light path length of the second path. The difference between the light path lengths can be adjusted by adjusting the arrangement of the reflecting film 215. For example, the difference in the light path length can be eliminated by increasing the distance between the reflecting film 215 and the PBS film 211. Thus, the extent to which the transmitted light is attenuated in the first path and the extent to which the reflected light is attenuated in the second path can be made equivalent to each other, and thus the symmetric property of the light emitted from the polarization conversion element can be made preferable. Further, the phase difference between the transmitted light and the reflected light can also be adjusted, thus the harmful influence due to the interference between the transmitted light thus emitted and the reflected light thus emitted can be reduced.

It should be noted that although in the first embodiment there is adopted the light source device 10 using the reflector divided into the first reflector 105 and the second reflector 106, the light source device using the whole circumference reflector can also be adopted. Even in the light source device using the whole circumference reflector, there is the case in which the intensity distribution of the light emitted therefrom is asymmetric. For example, in the case of forming the whole circumference reflector by bonding two reflector parts, which are formed by, for example, die forming, to each other, the symmetric property between the both sides across the interface of bonding is apt to be lost due to insufficient accuracy of alignment of the components and so on. Further, if the accuracy of the metal mold used for die forming is insufficient, the symmetric property in a plane parallel to the interface described above is apt to be lost. As described above, if the invention is applied to the case in which the direction the symmetric property in which is apt to be lost is estimated, the asymmetric property in the intensity distribution can be improved.

Further, the number of times of reflection of the transmitted light in the first path and the number of times of reflection of the reflected light in the second path can arbitrarily be varied in accordance with, for example, the number of reflecting surfaces including the reflecting films disposed in the first path or the second path. In either case, it is sufficient that the number of times of reflection of the transmitted light is an even number and the number of times of reflection of the reflected light is an odd number, or that the number of times of reflection of the transmitted light is an odd number and the number of times of reflection of the reflected light is an even number.

Further, although in the first embodiment, the splitting section is formed of the PBS film 211, a wire grid or the like can also be used instead of the PBS film 211. Further, as the illuminance equalizing optical system, the function as a part of or the whole of the overlapping optical system can also be adopted.

Second Embodiment

Then, an illumination apparatus according to a second embodiment of the invention will be explained. The second embodiment is different from the first embodiment in that the illumination apparatus is configured with a polarization conversion element different from the polarization conversion element according to the invention.

Figure 5A:
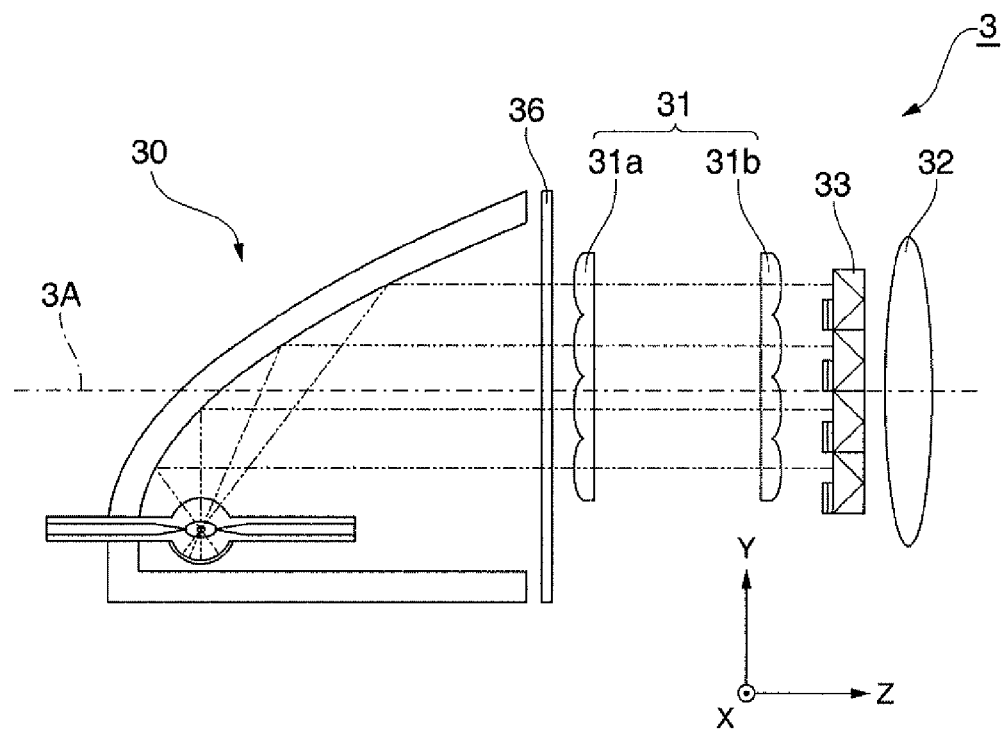
FIG. 5A is a configuration diagram of a second embodiment.
Figure 5B:
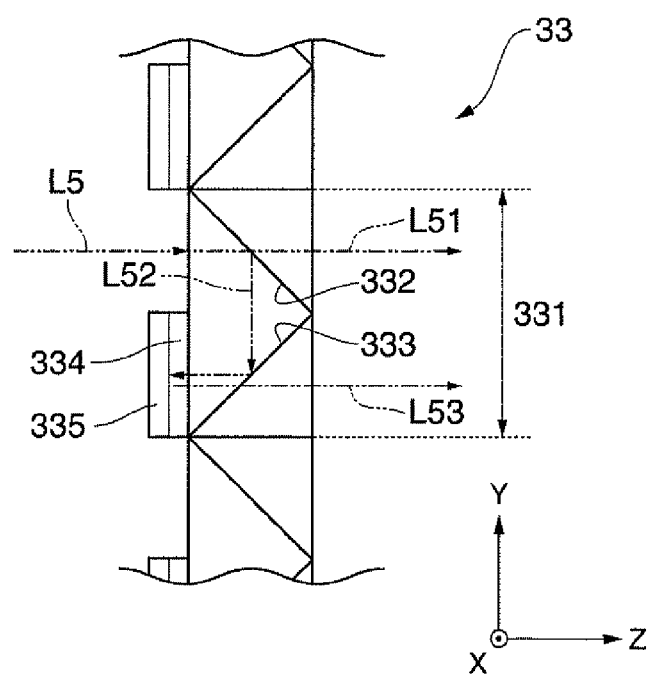
FIG. 5B is an enlarged view of the polarization conversion element.

FIG. 5A is a schematic diagram showing schematic configuration of the illumination apparatus 3 according to the second embodiment, and FIG. 5B is a schematic diagram enlargedly showing the polarization conversion element.

As shown in FIG. 5A, the illumination apparatus 3 is provided with a light source device 30, an illuminance equalizing optical system 31, a condenser lens 32, a polarization conversion element 33, and a filter 36. In the illumination apparatus 3, the constituents other than the polarization conversion element 33 are the same as those of the first embodiment. The light source light emitted from the light source device 30 proceeds along the illumination light axis 3A, and illuminates an illuminated area after passing through the filter 36, the illuminance equalizing optical system 31, the polarization conversion element 33, and the condenser lens 32 in this order.

As shown in FIG. 5A, the polarization conversion element 33 is provided with a plurality of polarization conversion units 331. Each of the polarization conversion units 331 has PBS films 332, 333, a quarter phase plate 334, and a reflecting member 335. The PBS film 332 forms an entrance area where the light beam L5 enters the polarization conversion unit 331 from the light source device 30, and functions as a polarization splitting section.

The light beam L5 has an intensity distribution asymmetric in the Y direction similarly to the case of the first embodiment, and the light axis of the light beam L5 is arranged to be substantially parallel to the illumination light axis 3A. The PBS film 332 is arranged to be disposed so as to be substantially parallel to the direction (the X direction) perpendicular to both of the direction (the Y direction) in which the intensity distribution of the light beam L5 is asymmetric and the direction along the illumination light axis 3A, and to form an angle of approximately 45° with the illumination light axis 3A.

The PBS film 333 is disposed so as to be perpendicular to the PBS film 332, and forms an angle of approximately 45° with the illumination light axis 3A. The reflecting member 335 is disposed closer to the light source device 30 side than the PBS film 333 in the direction along the illumination light axis 3A. The quarter phase plate 334 is disposed between the PBS film 333 and the reflecting member 335. The quarter phase plate 334 and the reflecting member 335 are both disposed so as that the surface thereof to which the light is input is substantially perpendicular to the illumination light axis 3A.

In the polarization conversion element 33 with the configuration described hereinabove, the P polarized light to the PBS film 332 out of the light beam L5 having entered the PBS film 332 becomes the light beam L51 after being transmitted through the PBS film 332. The light beam L51 is directly emitted from the polarization conversion unit 331 in the direction along the illumination light axis 3A.

The S polarized light to the PBS film 332 out of the light beam L5 is reflected by the PBS film 332 and folded approximately 90° in the light axis. The light beam L52 reflected by the PBS film 332 enters the PBS film 333 and is folded approximately 90° in the light axis, and then enters the reflecting member 335 after passing through the quarter phase plate 334. The light beam L52 having entered the reflecting member 335 is reflected and folded by the reflecting member 335, and then reenters the PBS film 333 after passing through the quarter phase plate 334. The reflected light is converted in the polarization state to be the P polarized light by passing through the quarter phase plate 334 two times between when being reflected by the PBS film 333 and when reentering the PBS film 333. The light beam L53 converted into the P polarized light passes through the PBS film 333, and is then emitted in the direction along the illumination light axis 3A similarly to the light beam L51.

As described above, the transmitted light out of the light beam L5 is emitted while keeping the polarization state of the P polarized light, and the number of times of reflection inside the polarization conversion unit 331 is zero (an even number). The reflected light out of the light beam L5 is emitted after being converted in the polarization state from the S polarized light to the P polarized light, and the number of times of reflection inside the polarization conversion unit 331 is three (an odd number). Since the difference in the number of times of reflection between the transmitted light and the reflected light is an odd number (three times here) inside the polarization conversion unit, the asymmetric property in the intensity distribution of the light beam emitted from the polarization conversion unit 331 is weakened as a whole compared to the light beam L5.

Third Embodiment

Then, an illumination apparatus according to a third embodiment of the invention will be explained. The third embodiment is different from the first embodiment in that the first reflector is formed of a part of a spheroid, and that the polarization conversion element is formed of a single polarization conversion unit.

Figure 6:
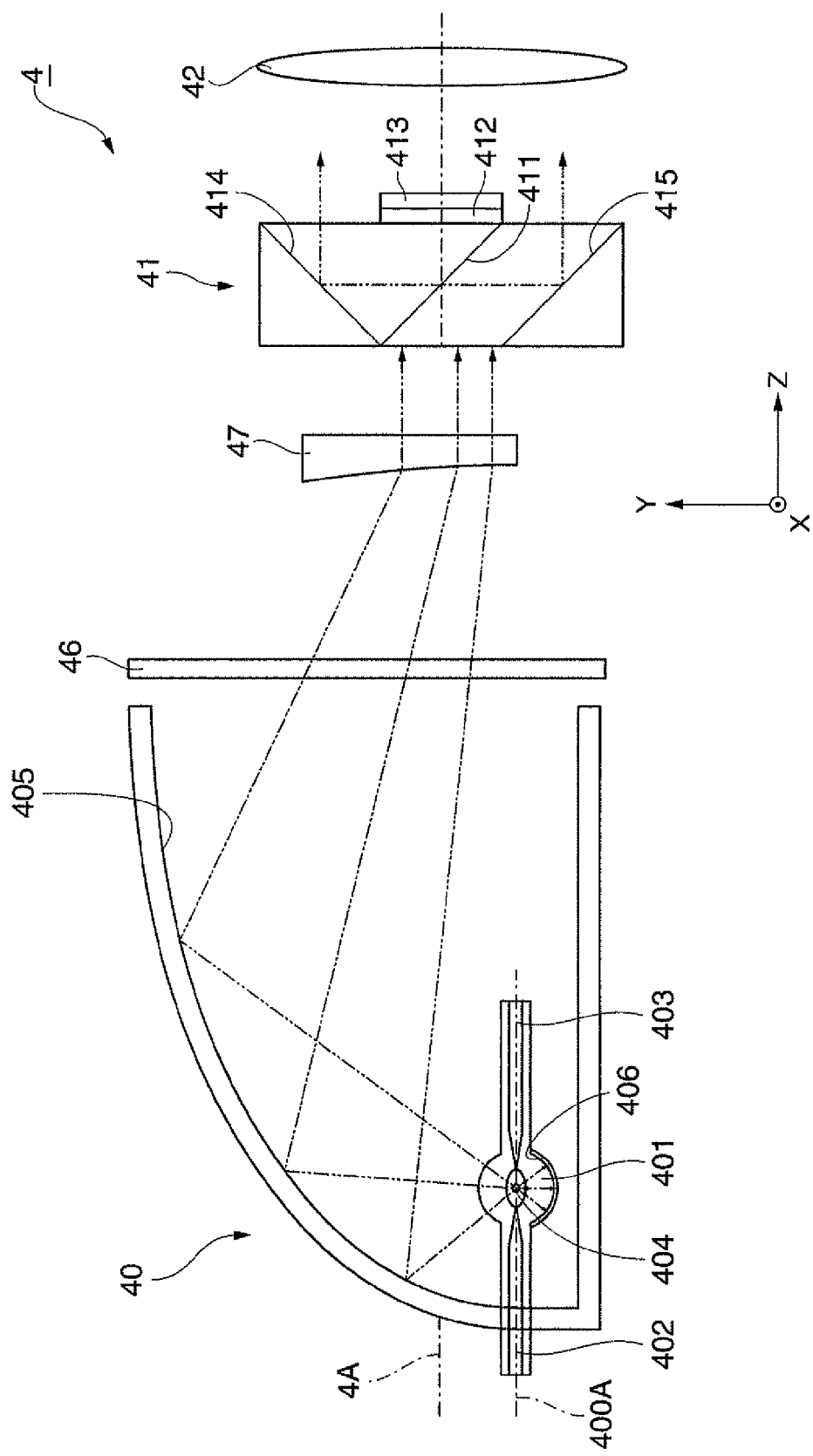
FIG. 6 is a schematic diagram showing a general configuration of an illumination apparatus according to a third embodiment.

FIG. 6 is a schematic diagram showing a general configuration of an illumination apparatus 4 according to the third embodiment.

As shown in FIG. 6, the illumination apparatus 4 is provided with a light source device 40, a polarization conversion element 41, a condenser lens 42, a filter 46, and a collimating lens (a converging optical system) 47. The condenser lens 42 and the filter 46 are the same as those in the first embodiment.

The light source device 40 is mainly composed of a lamp light source and a reflector. The lamp light source is exactly the same as that of the first embodiment, and disposed so as to extend in a direction along the lamp axis 400A parallel to the illumination light axis 4A. The lamp light source has a light emitting tube 401 and a pair of electrodes 402, 403. The lamp light source can be regarded as a point light source having a light emitting point 404.

The reflector of the light source device 40 is mainly composed of a first reflector 405 and a second reflector 406. The second reflector 306 is the same as that in the first embodiment. The first reflector 405 of the present embodiment is formed of a part of a spheroid obtained by rotating an ellipsoid having the light emitting point 404 as the primary focal point around the lamp axis 400A. The location of the secondary focal point of the ellipsoid can arbitrarily be set. By adjusting the location of the secondary focal point, the direction of the light axis of the light source device 40, the angle distribution of the light emitted from the light source device 40, and so on can be adjusted. Here, the secondary focal point of the ellipsoid is set in the focal position of the collimating lens 47 on the lamp axis 400A.

In the light source device 40, the light emitted from the light emitting point 404 directly toward the first reflector 405 and the light emitted from the light emitting point 404 to the first reflector 405 indirectly via the second reflector 406 are input to the first reflector 405. The light entering the first reflector 405 is reflected by the first reflector 405 and then emitted from the light source device 40, and at the same time, focused on the secondary focal point of the spheroid forming the first reflector 405. The intensity distribution of the light emitted from the light source device 40 is asymmetric in the Y direction similarly to the case of the first embodiment.

The light emitted from the light source device enters the collimating lens 47 after the filter 46 eliminates unnecessary light therefrom. Since the focal point of the collimating lens 47 is identical to the secondary focal point of the first reflector 405 described above, the light having entered the collimating lens 47 is converged in the infinite direction to form collimated light, and input to the entrance area of the polarization conversion element 41.

The polarization conversion element 41 has substantially the same configuration as that of the polarization conversion unit explained as the first embodiment. The polarization conversion element 41 has a PBS film 411, a quarter phase plate 412, a reflecting member 413, and reflecting films 414, 415. The PBS film 411 forms the entrance area of the polarization conversion element 41.

The light having entered the PBS film 411 is split into the transmitted light and the reflected light in the direction (the Y direction) in which the intensity distribution of the light is asymmetric. The transmitted light is reflected three times inside the polarization conversion element 41 similarly to the case of the first embodiment, and then emitted in the direction parallel to the illumination light axis 4A. Further, the transmitted light, which is P polarized light immediately after passing through the PBS film 411, is converted into S polarized light by passing through the quarter phase plate 412 two times, and then emitted therefrom. The reflected light is reflected two times inside the polarization conversion element 41 similarly to the case of the first embodiment, and then emitted in the direction parallel to the illumination light axis 4A. The light emitted from the polarization conversion element 41 has improved asymmetric property in the intensity distribution compared to that before entering, and is arranged to illuminate the illuminated area with uniform illuminance via the condenser lens 42.

It should be noted that although in the third embodiment an example not using the illuminance equalizing optical system is explained, it is also possible to dispose the illuminance equalizing optical system explained as the first embodiment, for example, between the collimating lens 47 and the polarization conversion element 41 or between the polarization conversion element 41 and the condenser lens 42. In the case in which the illuminance equalizing optical system is disposed between the collimating lens 47 and the polarization conversion element 41, it is preferable to use the polarization conversion element having a plurality of polarization conversion units similarly to the first embodiment instead of the polarization conversion element 41. By making the lens section of the fly-eye lens array (the illuminance equalizing optical system) and the entrance area of the polarization conversion unit correspond to each other, the loss of the light can be reduced.

Projector

Figure 7:
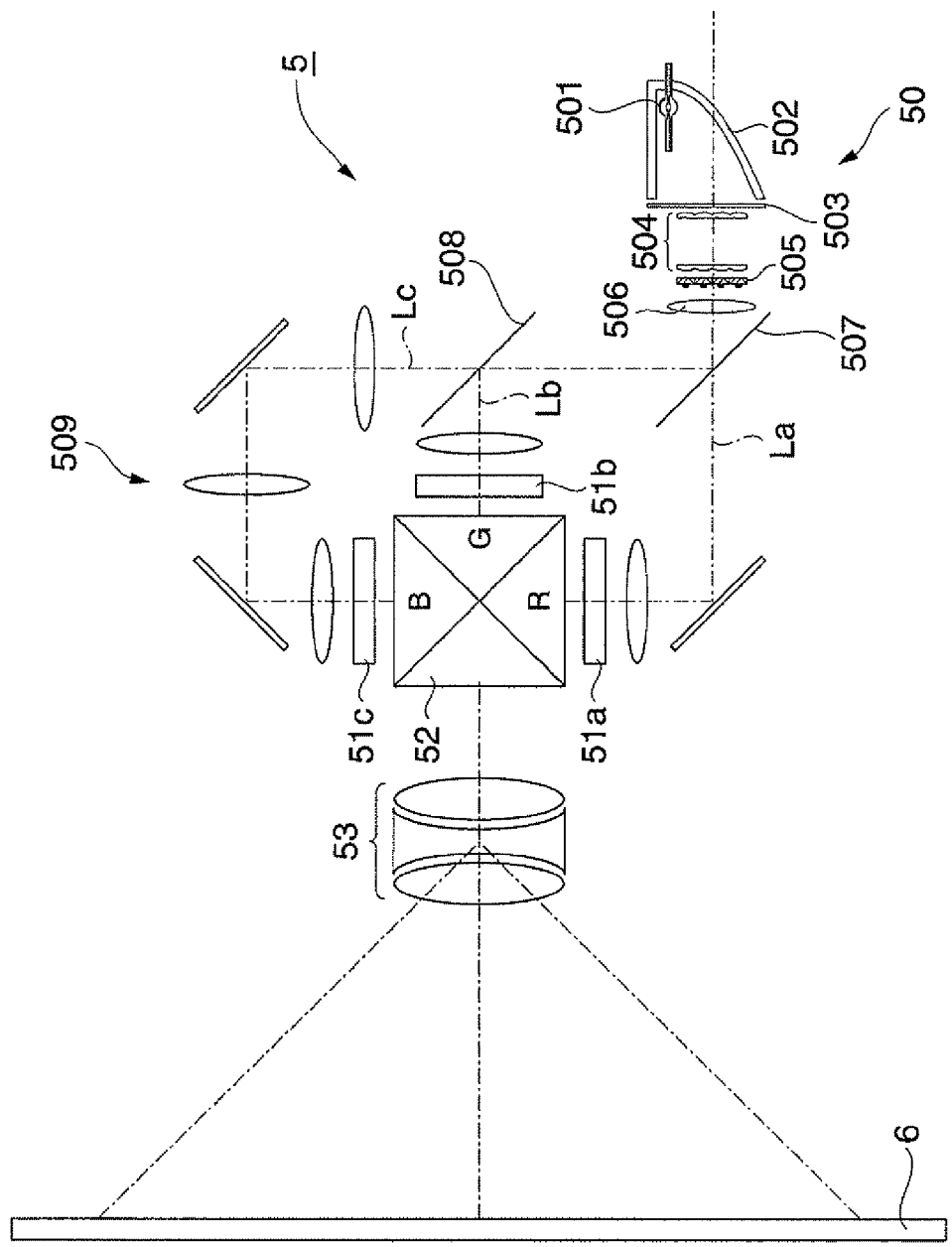
FIG. 7 is a schematic configuration diagram showing a projector as an embodiment of the invention.

Then, a projector as an embodiment of the invention will be explained with reference to FIG. 7. As shown in FIG. 7, the projector 5 is provided with an illumination apparatus 50, liquid crystal light valves (image forming devices) 51a, 51b, 51c, a dichroic prism 52, and a projection lens (a projection device) 53. The illumination apparatus of the invention is applied to the illumination apparatus 50, and the illumination apparatus 50 is provided with a lamp light source 501, a reflector 502, a filter 503, an illuminance equalizing optical system 504, a polarization conversion element 505, and a condenser lens 506. The light emitted from the illumination apparatus 50 enters the liquid crystal light valves 51a, 51b, 51c via the dichroic mirrors 507, 508, a relay optical system 509, and so on.

The dichroic mirrors 507, 508 are each formed by, for example, stacking a dielectric multilayer film on a glass surface. Thus, it is arranged that the colored light in a predetermined wavelength band is selectively reflected and the colored light in the other wavelength band is transmitted. For example, out of the light source light emitted from the illumination apparatus 50, red light La is transmitted through the dichroic mirror 507 while green light Lb and blue light Lc are reflected by the dichroic mirror 507. Further, out of the green light Lb and the blue light Lc reflected by the dichroic mirror 507, the blue light Lc is transmitted through the dichroic mirror 508 while the green light Lb is reflected by the dichroic mirror 508.

The red light La transmitted through the dichroic mirror 507 is reflected by a reflecting mirror, and then enters the liquid crystal light valve 51a for the red light via a collimating lens. The green light Lb reflected by the dichroic mirror 508 enters the liquid crystal light valve 51b for the green light via the collimating lens. The blue light Lc transmitted through the dichroic mirror 508 enters the liquid crystal light valve 51c for blue light via a relay optical system 509.

Each of the liquid crystal light valves 51a through 51c is, for example, an active matrix transmissive liquid crystal panel, and has a liquid crystal layer held between a pair of electrodes. Further, the liquid crystal light valves 51a through 51c are electrically connected to a signal source for supplying an image signal. When the image signal is supplied from the signal source, a voltage is applied between the electrodes, and the azimuth angle of the liquid crystal molecules is controlled in accordance with the applied voltage. Thus, the polarization state of the incident light can be varied, and it is arranged that the light with the grayscale corresponding to the polarization state can be obtained. The red light La, the green light Lb, and the blue light Lc thus modulated respectively by the liquid crystal light valves 51a through 51c enter the dichroic prism 52.

The dichroic prism 52 has a structure having triangular prisms bonded to each other, and a mirror surface reflecting the red light La and transmitting the green light Lb and a mirror surface reflecting the blue light Lc and transmitting the green light Lb are formed inside the dichroic prism 52 so as to be perpendicular to each other. The red light La, the green light Lb, and the blue light Lc are selectively reflected by or transmitted through these mirror surfaces, and emitted to the same side. Thus, the three colored light beams are overlapped with each other to form the composite light. The projection lens 53 enlargedly projects the composite light on a screen 6. It is arranged that the color display image can thus be obtained.

In the projector 5 described above, since the illumination apparatus 50 to which the illumination apparatus of the invention is applied is provided, the illumination apparatus 50 can be miniaturized, and the projector 5 can also be miniaturized. Further, it is possible for the illumination apparatus 50 to illuminate the liquid crystal light valves 51a through 51c with the uniform illuminance, thus the projector 5 capable of providing a high quality image is obtained. Further, since the liquid crystal light valves 51a through 51c are illuminated with the illumination light with the polarization state aligned by the polarization conversion element 505, the light representing the image can be formed using almost entire illumination light. Therefore, the light efficiency becomes preferable, and the projector 5 with low power consumption can be obtained.

It should be noted that although in the embodiment the example using the transmissive liquid crystal light valves as the image forming devices is described, it is also possible to use reflective liquid crystal light valves. In such a case, the optical system is appropriately modified to be suitable for using the reflective liquid crystal light valves.

The entire disclosure of Japanese Patent Application No: 2008-326787, filed Dec. 24, 2008 is expressly incorporated by reference herein.

What is claimed is:

1. An illumination apparatus comprising:
a light source device adapted to emit light having an asymmetric intensity distribution; and
a polarization conversion element adapted to align polarization states of the light emitted from the light source device,
wherein the polarization conversion element includes,
a splitting section adapted to split incident light input from the light source device into transmitted light and reflected light having the polarization states different from each other in a direction in which an intensity distribution of the incident light is asymmetric, and
a conversion section adapted to convert the polarization state of one of the transmitted light and the reflected light into the polarization state of the other of the transmitted light and the reflected light,
a mirror system adapted to emit the other light and the one light, which is converted by the conversion section, from the polarization conversion element in substantially the same direction is configured to include the splitting section, and
the mirror system is disposed so that the direction, in which the intensity distribution of the one light emitted from the polarization conversion element is asymmetric, is reversed with respect to a direction, in which the intensity distribution of the other light emitted from the polarization conversion element is asymmetric.

2. The illumination apparatus according to claim 1, wherein
a difference between a number of times of reflection of the one light inside the polarization conversion element and a number of times of reflection of the other light inside the polarization conversion element is an odd number.

3. The illumination apparatus according to claim 1, wherein
a reflecting surface adapted to reflect at least one of the one light and the other light inside the polarization conversion element is disposed so that a normal direction of the reflecting surface and the direction in which the intensity distribution of the incident light is asymmetric are substantially coplanar with each other.

4. The illumination apparatus according to claim 1, wherein
the conversion section includes
a reflecting member adapted to reflect and fold the transmitted light transmitted through the splitting section, and
a quarter wave plate disposed between the reflecting member and the splitting section.

5. The illumination apparatus according to claim 1, further comprising:
a converging optical system adapted to converge the light emitted from the light source device to the splitting section of the polarization conversion element.

6. The illumination apparatus according to claim 1, wherein
the light source device includes
a light source adapted to emit light,
a first reflector disposed so as to surround a first part of the light source and adapted to reflect the light emitted from the light source, and
a second reflector disposed so as to surround at least a second part of the light source different from the first part of the light source and adapted to reflect the light, which is emitted from the light source, toward the first reflector.

7. The illumination apparatus according to claim 1, wherein
the splitting section is formed of a polarization beam splitter.

8. The illumination apparatus according to claim 1, wherein
the polarization conversion element has a plurality of polarization conversion units each configured to include the splitting section, the conversion section, and the mirror system, and
the illumination apparatus further includes an overlapping optical system adapted to overlap light beams emitted from the respective polarization conversion units with each other in an illuminated area.

9. A projector comprising:
the illumination apparatus according to claim 1;
an image forming device adapted to form image light representing an image with light emitted from the illumination apparatus; and
a projection device adapted to project the image light formed by the image forming device.

10. A polarization conversion element comprising:
a splitting section adapted to split incident light with an asymmetric intensity distribution into transmitted light and reflected light having the polarization states different from each other in a direction in which the intensity distribution of the incident light is asymmetric; and
a conversion section adapted to convert the polarization state of one of the transmitted light and the reflected light (hereinafter referred to as one light) into the polarization state of the other of the transmitted light and the reflected light,
wherein a mirror system adapted to emit the other light and the one light, which is converted by the conversion section, in substantially the same direction is configured to include the splitting section,
a reflecting surface included in the mirror system is disposed so that a direction in which an intensity distribution of the one light emitted from the mirror system is asymmetric is reversed with respect to a direction in which an intensity distribution of the other light emitted from the mirror system is asymmetric, and
the mirror system is arranged such that the one light is reflected by the mirror system one or more times, the other light is reflected by the mirror system one or more times, and a difference between a number of times of reflection of the one light in the mirror system and a number of times of reflection of the other light in the mirror system is an odd number.

11. A polarization conversion element according to claim 10, wherein
a distance between the reflecting surface and the splitting section is adjusted so that a difference between a light path length of the one light and a light path length of the other light is eliminated.

* * * * *